United States Patent
Szeto

(10) Patent No.: US 9,811,485 B2
(45) Date of Patent: Nov. 7, 2017

(54) SINGLE RELAY SDIO INTERFACE WITH MULTIPLE SDIO UNITS

(71) Applicant: QUALCOMM Technologies International, Ltd., Cambridge (GB)

(72) Inventor: Victor Szeto, Phoenix, AZ (US)

(73) Assignee: QUALCOMM Incorporated, San Diego, CA (US)

( * ) Notice: Subject to any disclaimer, the term of this patent is extended or adjusted under 35 U.S.C. 154(b) by 269 days.

(21) Appl. No.: 14/746,036

(22) Filed: Jun. 22, 2015

(65) Prior Publication Data
US 2016/0371209 A1    Dec. 22, 2016

(51) Int. Cl.
G06F 13/36 (2006.01)
G06F 13/28 (2006.01)
G06F 13/12 (2006.01)
G06F 13/42 (2006.01)
G06F 13/38 (2006.01)
G06F 13/40 (2006.01)

(52) U.S. Cl.
CPC ............ G06F 13/28 (2013.01); G06F 13/124 (2013.01); G06F 13/385 (2013.01); G06F 13/4282 (2013.01); G06F 13/4022 (2013.01); G06F 13/4027 (2013.01)

(58) Field of Classification Search
None
See application file for complete search history.

(56) References Cited

U.S. PATENT DOCUMENTS

2004/0202015 A1* 10/2004 Tai ...................... G06F 11/2221 365/154
2005/0086413 A1    4/2005 Lee et al.
2007/0238483 A1* 10/2007 Boireau ............... H04B 1/0057 455/553.1
2009/0177816 A1*  7/2009 Marx .................. G06F 13/1668 710/72
2010/0011128 A1*  1/2010 Paycher ............... G06F 13/102 710/1
2011/0145556 A1    6/2011 Hakoun et al.
2011/0185098 A1*  7/2011 Kim ................. G06K 19/07743 710/301
2012/0243559 A1    9/2012 Pan et al.
2013/0045777 A1*  2/2013 Yang ........................ H04B 1/38 455/558

(Continued)

FOREIGN PATENT DOCUMENTS

EP    2645638 A1    10/2013

OTHER PUBLICATIONS

Partial International Search Report—PCT/EP2016/063949—ISA/EPO—dated Aug. 16, 2016.

*Primary Examiner* — Henry Tsai
*Assistant Examiner* — Aurangzeb Hassan
(74) *Attorney, Agent, or Firm* — Procopio, Cory, Hargreaves & Savitch LLP

(57) ABSTRACT

A system and method communicates with one of two or more secure digital input output (SDIO) units that only one SDIO unit responds when it is being addressed. The SDIO unit has an SDIO clock input port, an SDIO data bus output port, and an SDIO bidirectional command port. Each SDIO unit has an address indicator within it associated with each SDIO unit. An SDIO unit will not respond to an SDIO command unless an SDIO unit address encoded in the SDIO command matches its address indicator.

16 Claims, 15 Drawing Sheets

(56) References Cited

U.S. PATENT DOCUMENTS

| | | | |
|---|---|---|---|
| 2013/0103862 A1* | 4/2013 | Zheng | G06F 13/4291 710/22 |
| 2013/0143622 A1 | 6/2013 | Zhao et al. | |
| 2015/0039923 A1* | 2/2015 | Wu | G06F 1/3278 713/323 |
| 2016/0211985 A1* | 7/2016 | Castillo | F24F 11/006 |
| 2016/0371203 A1* | 12/2016 | Riess | G06F 13/1642 |
| 2016/0371214 A1* | 12/2016 | Szeto | G06F 13/28 |

* cited by examiner

IO_RW_DIRECT Command (CMD52)

| S | D | Command Index 110100b | R/W Flag | Function Number | R/W Flag | Stuff | Register Address | Stuff | Write Data or Stuff Bits | CRC7 | A |
|---|---|---|---|---|---|---|---|---|---|---|---|
| 1 | 1 | 6 | 1 | 3 | 1 | 1 | 17 | 1 | 8 | 7 | 1 |

Number Of Bits

Figure 11

SINGLE RELAY SDIO INTERFACE WITH MULTIPLE SDIO UNITS

FIELD OF THE INVENTION

Various configurations of the current invention relate generally to apparatus, systems and methods of transferring digital data. More particularly, the apparatus, systems, and methods relate to several devices sharing a common data interface. Specifically, the apparatus, systems, and methods provide for transmitting and receiving Secure Digital Input/Output (SDIO) commands between a single SDIO host several SDIO devices.

BACKGROUND OF THE INVENTION

The Secure Digital (SD) standard was introduced in August 1999 as an improvement over Multi-Media Cards (MMC). The Secure Digital standard is maintained by the SD Association (SDA). SD technologies have been implemented in hundreds of brands, across dozens of product categories, and in thousands of electronic devices. SD is often used in nonvolatile memory cards. These memory cards are extensively used in portable devices, such as mobile phones, digital cameras, GPS navigation devices, handheld consoles, and tablet computers. The Secure Digital format includes four card families available in three different form factors. The four families are the original Standard-Capacity (SDSC), the High-Capacity (SDHC), the eXtended-Capacity (SDXC), and the SDIO, which combines input/output functions with data storage. With the exception of SDIO, these standards can be implemented in three form factors: original size, mini size, and micro size. Electrically passive adapters allow a smaller card to fit and function in a device built for a larger card.

The Secure Digital Input Output interface standard is a more recent extension of the SD specification to cover I/O functions. The SDIO standardized interface has a low pin count. SDIO cards are only fully functional in host devices designed to support their input/output functions (typically Personal Digital Assistants (PDAs), but occasionally laptops or mobile phones). These devices can use the SD slot to support Global Positioning System (GPS) receivers, modems, barcode readers, FM radio tuners, TV tuners, Radio Frequency Identification (RFID) readers, digital cameras, and interfaces to Wi-Fi, Bluetooth, Ethernet, and IrDA. SDIO cards support most of the memory commands of SD cards. SDIO cards can be structured as eight logical cards, although currently, the typical way that an SDIO card uses this capability is to structure itself as one I/O card and one memory card.

SDIO and SD interfaces are mechanically and electrically similar. Host devices built for SDIO cards generally accept SD memory cards without I/O functions. However, the reverse is not true; host devices need suitable drivers and applications to support the card's I/O functions. Inserting an SDIO card into any SD slot causes no physical damage nor disruption to the host device, but users may be frustrated that the SDIO card does not function fully when inserted into a seemingly compatible slot. What is needed is a better way to interact with SDIO devices.

SUMMARY OF THE INVENTION

According to one aspect of the invention a secure digital/input output (SDIO) unit is provided that only responds when it is being addressed. The SDIO unit has an SDIO clock input port, an SDIO data bus output port with up to three bidirectional lines, and an SDIO bidirectional command port. In one configuration, an address indicator within the SDIO unit corresponds to the SDIO unit and the SDIO unit will use this address to know when to respond to a command. In another configuration, the SDIO unit will not have an address assigned to it, but will look for an SDIO unit address encoded in the SDIO command to determine if it is to respond to that command.

Another aspect of the invention provides a secure digital input/output (SDIO) system. The system includes a host, an SDIO interface connected to the host, a first Relay SDIO (RSDIO) unit connected to the SDIO interface, and a second RSDIO unit connected to the SDIO interface. The RSDIO units may have addresses assigned to them during in initialization/configuration phase. The first RSDIO unit includes a first SDIO command port, and an RSDIO relay port connected to the second RSDIO unit, and SDIO relay logic. The SDIO relay logic determines if the first RSDIO unit is to process an SDIO command received on the first SDIO command port by examining the device address contained in the SDIO command as mentioned above and discussed in more detail later. When the first SDIO unit receives an SDIO command, it automatically transmits the command from the first RSDIO relay port to a second SDIO command port in the second RSDIO unit. When the first RSDIO unit is to process the SDIO command, the first RSDIO unit processes the SDIO command and sends results of processing the SDIO command to the SDIO interface.

In some embodiments, the RSDIO relay port is a first RSDIO relay port and the SDIO relay logic is a first SDIO relay logic, and the SDIO system further includes a third RSDIO unit connected to the SDIO interface. The third RSDIO unit has a third SDIO command port. The second RSDIO unit includes a second RSDIO relay port connected to the third SDIO command port and a second SDIO relay logic. When the second SDIO unit receives the SDIO command, it automatically transmits the command from the second RSDIO relay port to the SDIO command port in the third RSDIO unit. The second SDIO relay logic determines if the second RSDIO unit is to process the SDIO command. When the second RSDIO unit is to process the SDIO command, the second RSDIO unit processes the SDIO command and sends results of processing the SDIO command to the SDIO interface and to the first RSDIO relay port and the first RSDIO unit relays the results to the host. Other embodiments may have more than three RSDIO units as long as protocol timing requirements are met.

In another embodiment, a host would be made aware of one SDIO unit and unaware of others SDIO units requiring separate addressing. This embodiment makes use of the SDIO concept of logical functions. As understood by those of ordinary skill in the art, a different SDIO function number may be assigned to each of the devices for single function devices (alternatively different sets of function addresses may be used for multi-function devices). The advantage of this approach is that the host would be simplified as it could use standard SDIO functionality, rather than having to re-interpret standard facilities to enable a bus protocol.

BRIEF DESCRIPTION OF THE DRAWINGS

One or more preferred embodiments that illustrate the best mode(s) are set forth in the drawings and in the following description. The appended claims particularly and distinctly point out and set forth the invention.

The accompanying drawings, which are incorporated in and constitute a part of the specification, illustrate various example methods and other example embodiments of various aspects of the invention. It will be appreciated that the illustrated element boundaries (e.g., boxes, groups of boxes, or other shapes) in the figures represent one example of the boundaries. One of ordinary skill in the art will appreciate that in some examples one element may be designed as multiple elements or that multiple elements may be designed as one element. In some examples, an element shown as an internal component of another element may be implemented as an external component and vice versa. Furthermore, elements may not be drawn to scale.

FIG. 11 illustrates an embodiment of an SDIO IO_WR_DIRECT Command where unused bits of its Register Address can be used to address different SDIO units.

Similar numbers refer to similar parts throughout the drawings.

DETAILED DESCRIPTION OF THE DRAWINGS

Figure 1:
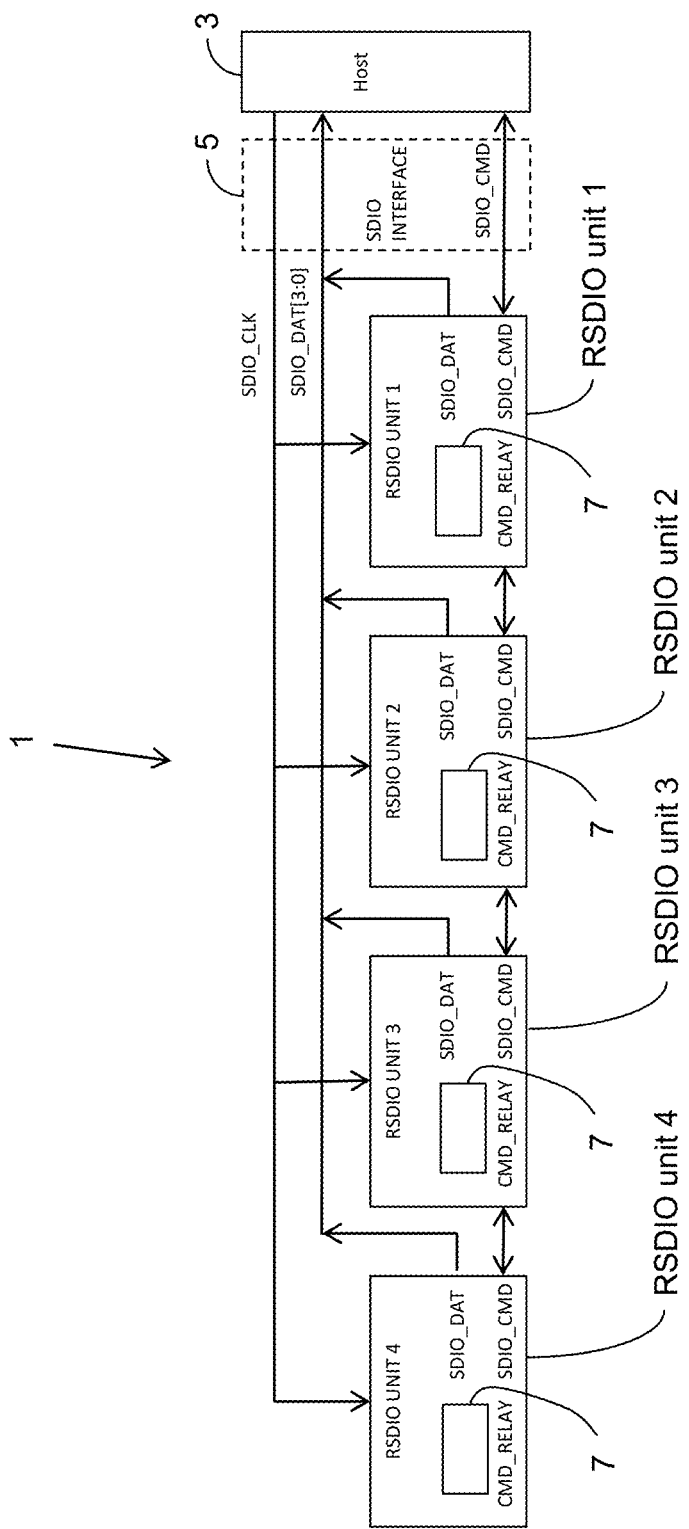
FIG. 1 illustrates one example embodiment of a Relay SDIO (RSDIO) system.

In the past, a host using an SDIO interface was only able to communicate with a single SDIO slave device through each single SDIO interface. FIG. 1 illustrates an example embodiment of a novel relay SDIO (RSDIO) system 1 having a host 3 that uses a single SDIO interface 5 to communicate with four RSDIO units 1-4. While four SDIO units are illustrated, it is appreciated that this novel invention could use a single SDIO interface to communicate with two or more SDIO devices and is not limited to four SDIO units.

Figure 2:
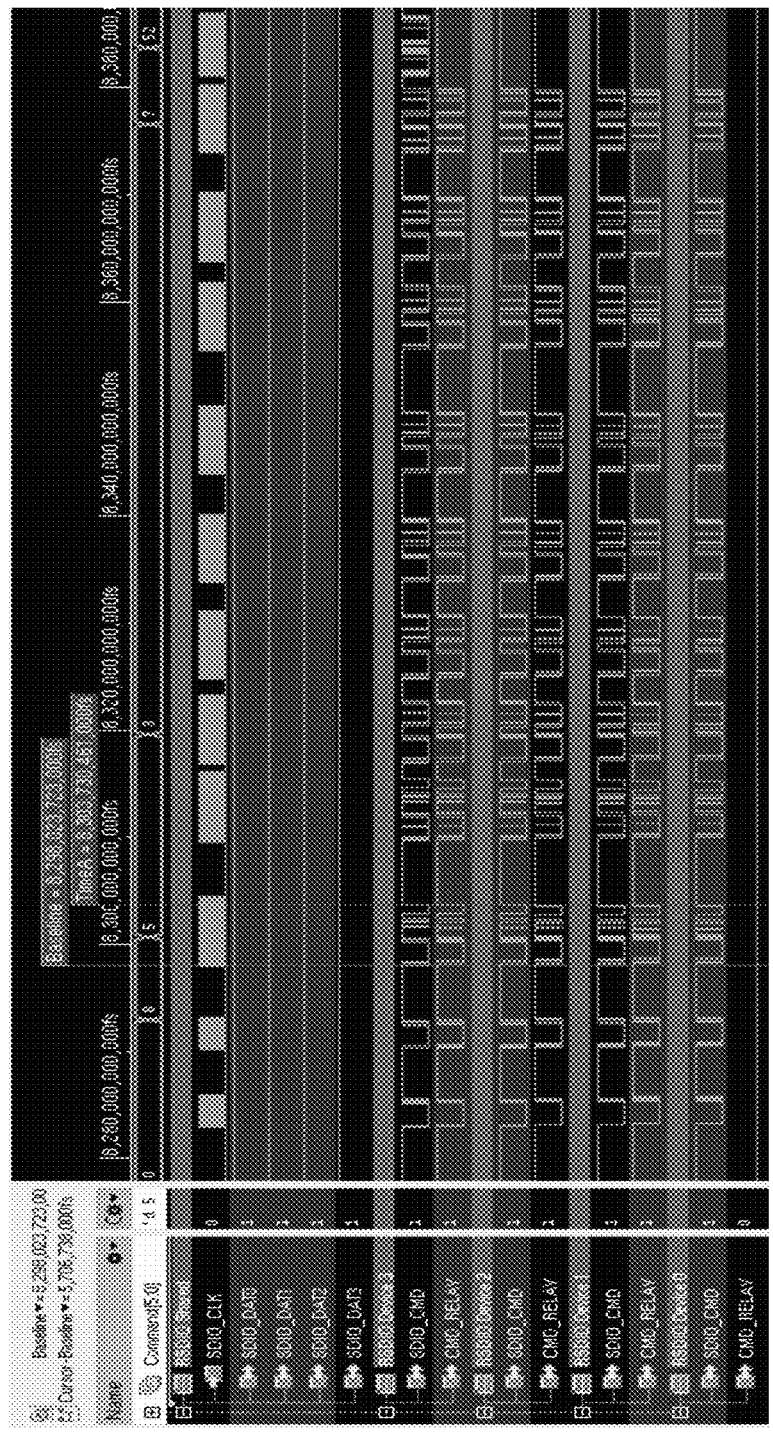
FIG. 2 illustrates example signals of one example embodiment of a relay SDIO initialization sequence.
Figure 3:
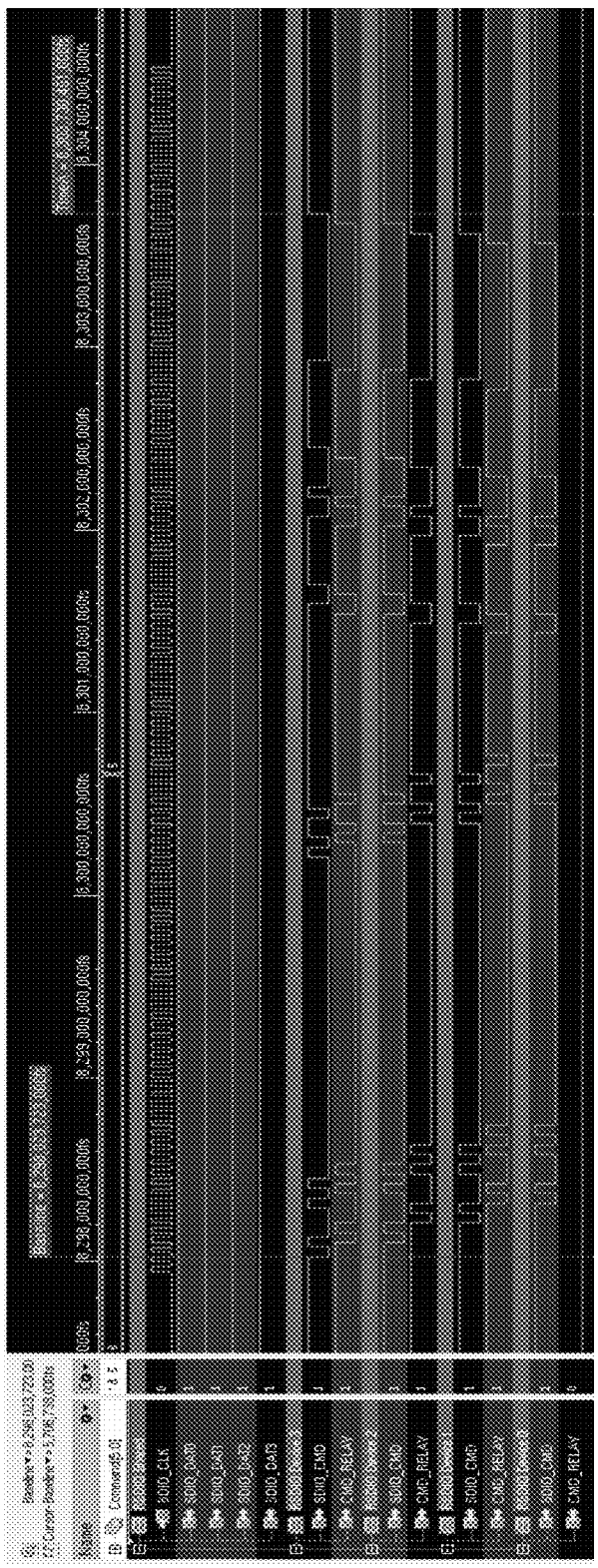
FIG. 3 illustrates example signals of relay SDIO command and response timing.

In addition to the standard SDIO signals: SDIO_CLK (SDIO Clock), SDIO_CMD (SDIO Command), and SDIO_DAT[3:0], each RSDIO unit RSDIO 1-4 may transfer (e.g., relay) the SDIO command and response to/from the next RSDIO unit through a bidirectional CMD_RELAY port built into RSDIO units 1-4. As illustrated in FIG. 1, each RSDIO unit 1-4 is connected to the next RSDIO unit in the relay chain with CMD_RELAY connected to the next RSDIO unit's SDIO_CMD. In some embodiments, the last RSDIO device's CMD_RELAY port may be tied to ground so it can detect it is the last device in the relay chain. FIG. 2 illustrates a relay SDIO initialization sequence and FIG. 3 illustrates some details of relay SDIO command and response timing.

Figure 5:
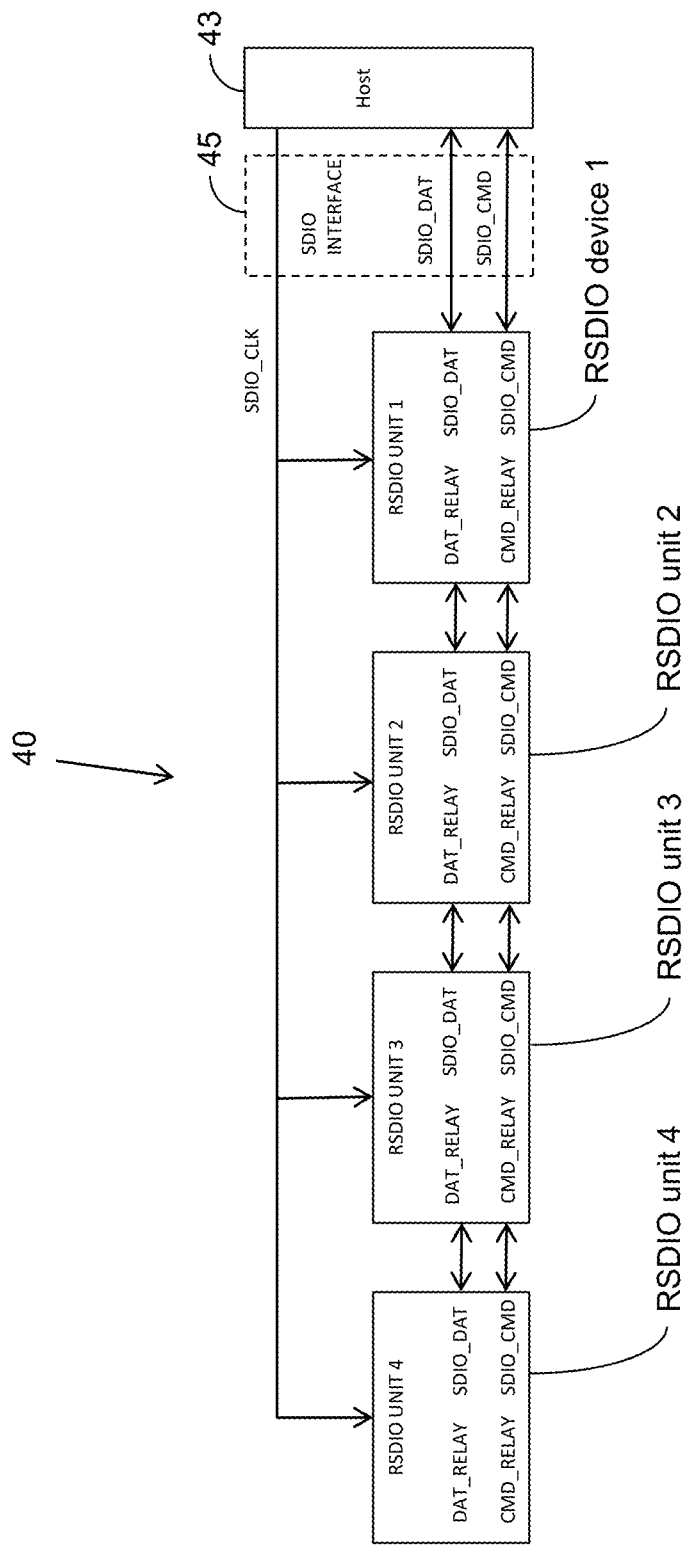
FIG. 5 illustrates another example embodiment of a relay SDIO system that has relayed SDIO data.

In some configurations, the SDIO data signals (SDIO_DAT) of multiple devices may also similarly be relayed as illustrated in FIG. 5 that is discussed below or the SDIO data signal may be connected to a common shared tri-state bus as illustrated in FIG. 1. Relaying SDIO_DAT between RSDIO units 1-4 provides superior signal integrity, while using a shared bus reduces the number of pins required on each connected RSDIO unit 1-4. In the example RSDIO system 1 of FIG. 1, up to four RSDIO units 1-4 may drive the shared uni-directional SDIO_DAT[3:0] signal lines to host 3. However, as previously mentioned, other embodiments may be implemented with more than four RSDIO units/devices.

Figure 10:
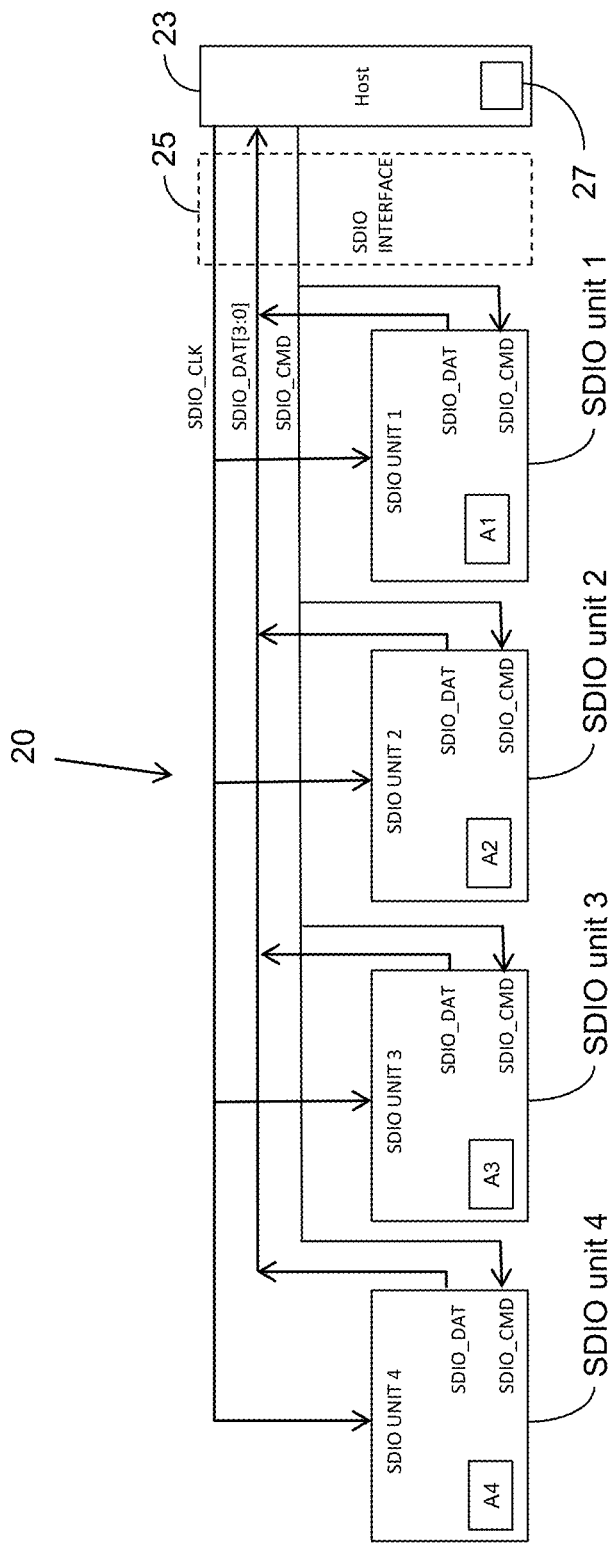
FIG. 10 illustrates one example embodiment of an SDIO system that uses a single SDIO port to access two, or up to an arbitrary number, of SDIO units without the need for relaying an SDIO command.

An addressing mechanism is now briefly introduced that may be used in the relayed implementations of FIGS. 1 and 5 and/or the non-relayed implementation of FIG. 10. For example, an addressing scheme may make use of a standard SDIO command such as the CMD52 and/or CMD53 commands and responses. These commands often perform a bulk of the SDIO communications between a host and another device. For CMD52, 'N' bits of the 'register address' field may be re-purposed as an SDIO unit address. This is compatible with current SDIO devices which typically only use a portion of the register address space. Relayed and non-relayed SDIO units can decode these address bits to determine if they are being addressed, as discussed further below.

RSDIO system 1 of FIG. 1 supports standard interface compatibility. Intermediate devices, such as RSDIO units 1-4, contain SDIO relay logic 7 allowing RSDIO system 1 to operate; however, host 3 and other possible terminal devices (SDIO Flash, etc.) that may be included in the example SDIO system 1 of FIG. 1 may be standard SDIO compatible devices lacking the need for special SDIO relay logic 7.

"Logic", as used herein, includes but is not limited to hardware, firmware, software, and/or combinations of each to perform a function(s) or an action(s), and/or to cause a function or action from another logic, method, and/or system. For example, based on a desired application or need, logic may include a software-controlled microprocessor, discrete logic such as an application-specific integrated circuit (ASIC), a programmed logic device, a memory device containing instructions, or the like. Logic may include one or more gates, combinations of gates, or other circuit components. Logic may also be fully embodied as software. Where multiple logical logics are described, it may be possible to incorporate the multiple logics into one physical logic. Similarly, where a single logic is described, it may be possible to distribute that single logic between multiple physical logics.

Figure 4:
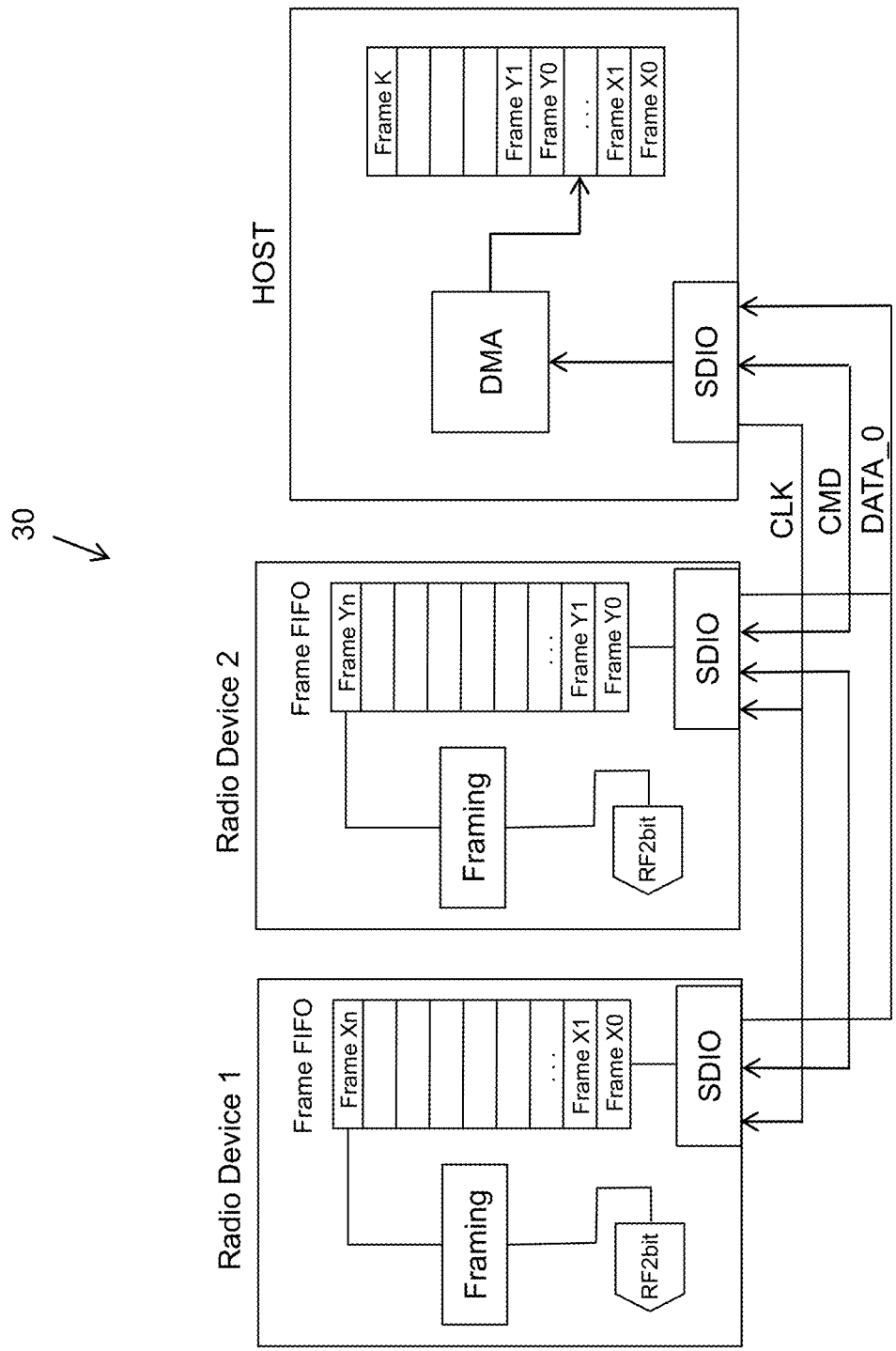
FIG. 4 illustrates another embodiment of a relay SDIO system that has two radio devices.

FIG. 4 illustrates another embodiment of an RSDIO system 30 that uses a relayed RSDIO_CMD signal. As illustrated, this embodiment includes a host and two radio devices 1-2. Each radio device 1-2 has a two bit RF receiver (RF2 bit), a framing logic to construct frames of incoming data, and a frame FIFO connected to an SDIO interface. The host includes an SDIO port, a direct memory access (DMA) unit, and a FIFO.

As illustrated, each radio device 1-2 responds to SDIO commands. Each radio device arbitrates for the SDIO bus to ensure frames are properly transferred to the host FIFO, as illustrated. In one embodiment, data frames from multiple radio tuner frontends are transferred to the host DMA via one shared SDIO bus. In this example embodiment, radio devices 1-2 transfer frames of the same size and have the same FIFO size. In some embodiments, the frame rate may be different depending on the received signal bandwidth.

For EMI reasons it may not be acceptable to transmit data periodically at these rates, which are in the audio range. In some configurations, a scattered transmission scheme with varying frame counts and randomized delays may be implemented. This requirement may be needed for analog modes.

FIG. 5 illustrates an embodiment of a system 40 that is similar to the RSDIO system 1 of FIG. 1. The RSDIO system 40 of FIG. 5 has a host 43, a standard SDIO interface 45, and RSDIO devices 1-4. In this RSDIO system 40, RSDIO devices 1-4 have both relayed command signals (SDIO_CMD) and relayed data signals (SDIO_DAT). This embodiment uses only one pin for the SDIO_DAT signal and, therefore, may have a smaller pin count than other implementations that used multiple pins for data signals. Other embodiments may use more than one SDIO_DAT line/signal.

Referring back to FIG. 1, if RSDIO unit 1 receives an SDIO_CMD signal, its SDIO relay logic 7 will determine whether RSDIO unit 1 is to perform the corresponding SDIO command and transmit those results back to the host 3. RSDIO unit 1 always automatically generates and outputs a CMD_RELAY signal to relay the SDIO command to RSDIO unit 2. As discussed further below, one way SDIO relay logic 7 can determine if its corresponding SDIO unit 1 is to process a command is to compare an address encoded in the SDIO unit to address bits in the SDIO_CMD instruction.

When RSDIO unit 2 receives the CMD_RELAY signal from RSDIO unit 1 at its SDIO_CMD input, its SDIO relay logic 7 will automatically will generate and output a CMD_RELAY signal to RSDIO unit 3. The SDIO relay logic 7 will check to see if RSDIO unit 2 is to process the instruction. If RSDIO unit 2 is to process the command, it will process the command and forward output data back to host 3. Output data to be transmitted on the SDIO_CMD line will first be forwarded back through RSDIO unit 1 on its way back to host 3. Similarly, when RSDIO unit 3 receives the CMD_RELAY signal from RSDIO unit 2 at its SDIO_CMD input, it would automatically relay it to RSDIO unit 4 and its SDIO relay logic 7 will similarly determine if RSDIO unit 3 is to respond. Similar will occur in RSDIO unit 4 and so on, if there were additional units, until the SDIO unit that is addressed by the command is found to execute the command.

Before describing RSDIO system 1 in more detail, some of its benefits and other characteristics are now described. The relay SDIO system 1 of FIG. 1 maintains the SDIO interface standard's goal of a pin efficient low speed high throughput shared interface while providing for system inter-chip communication with two or more SDIO chips using a single SDIO interface. Multiple devices may be addressed without additional pins. Many designs are pin limited and the embodiments described herein provide a pin-efficient solution for accessing multiple devices.

As illustrated in FIG. 1, RSDIO system 1 may be implemented with a single host to slave SDIO Clock (SDIO_CLK), a single bidirectional SDIO Command (SDIO_CMD), and one or more bidirectional SDIO Data (SDIO_DAT) signal pins. When implemented with three SDIO interface pins (assuming a 1 bit shared SDIO Data bus), host 3 of RSDIO system 1 may communicate with up to 15 slave devices at 50 Mbps or more. The number of connected devices may be limited by the number of bits used for addressing and/or by delay through the command relay chain as it may be desired that this delay meet a required SDIO response time with adequate signal integrity considerations (such as device drive strength when SDIO_DAT is not relayed).

In some relayed SDIO embodiments, a response may be detected from an adjacent RSDIO device connected to the CMD_RELAY output. This triggers a response counter which tracks the number of bits transmitted on the SDIO interface. The response is passed through to the SDIO_CMD signal to the next RSDIO device or host. Since one of the SDIO devices at a time may generate the response, there is no conflict on the relay signals. In some embodiments, the local SDIO FSM (Finite State Machine) is the default driver of SDIO_CMD and may generate a response.

In some configurations, a global address may be defined to simultaneously access all RSDIO units 1-4. The last device (or any so designated device) may generate a response for any global accesses which require one (such as read accesses). For example, SDIO "Function 0" accesses may be handled as global accesses so that all connected devices behave, from host's 3 perspective, as a single device. Those of ordinary skill in this art will appreciate that using "global commands" during an initialization phase may have one designated unit respond while the other are idle. Idle units do not reply so that they are not able to indicate if there were any errors on the SDIO bus. One possible solution is to check the state of the other previously devices once initialization and the use of global commands is complete. Additionally, these approaches work best when all the SDIO devices are identical.

Figure 6:
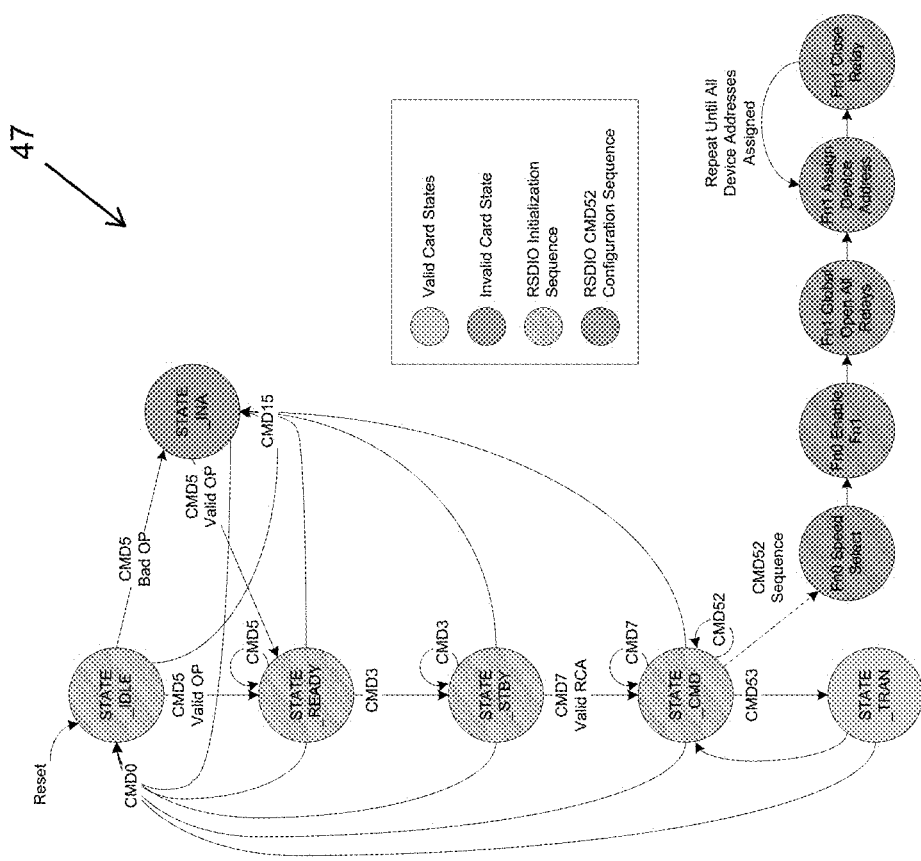
FIG. 6 illustrates and example state diagram of how relay SDIO devices may be initialized.
Figure 7:
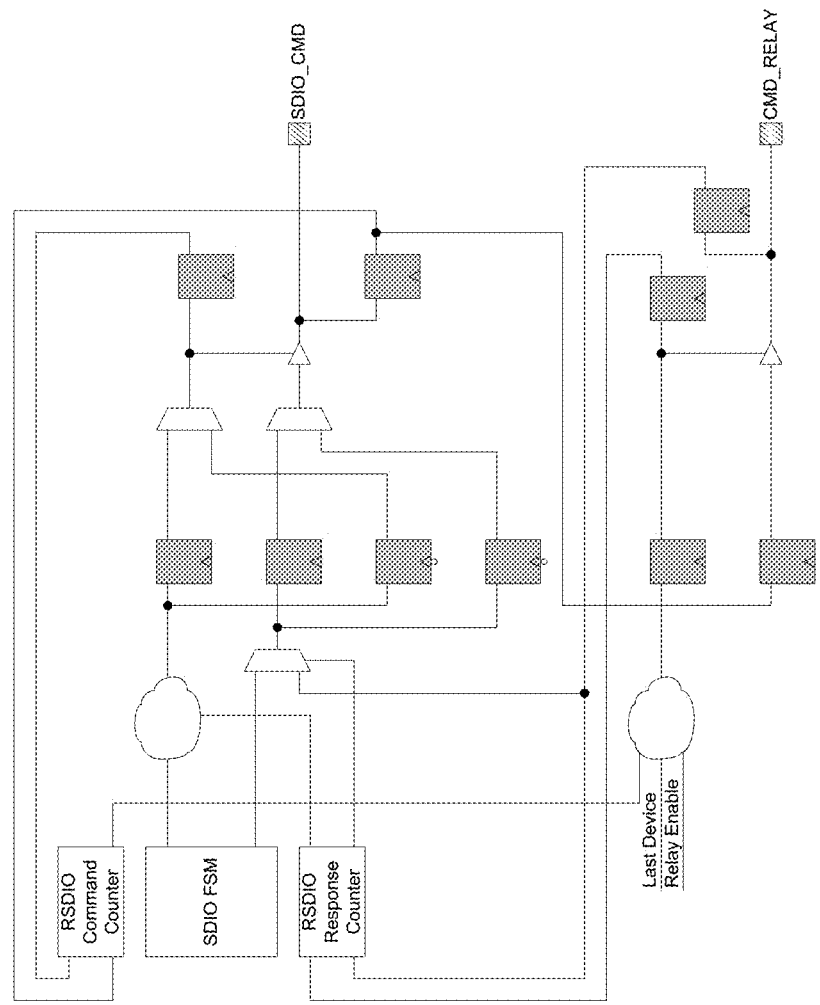
FIG. 7 illustrates an example block diagram of RSDIO logic.

In some embodiments, each of the SDIO units 1-4 of FIG. 1 may be initialized as shown in state diagram 47 illustrated in FIG. 6. FIG. 7 illustrates an example block diagram of some RSDIO logic 49 that may be implemented in the relay logic 7 discussed above.

The format of the device addresses and a global address may be implemented in different ways as understood by those of ordinary skill in the art. In one implementation, the three Msb's (Most Significant Bits) of the 17 bit SDIO CMD52/CMD53 address field are used to select RSDIO devices. In other embodiments, using addresses imbedded in commands may also be used by un-relayed SDIO devices such as those discussed below in FIG. 10. Furthermore, more or fewer bits may be used in other embodiments. Optionally, a global access may be performed (where all RSDIO devices are written) if the 3 Msb's are all set to a known value. One example memory map of address of logic functions may be implemented as follows:

```
Fn0 (Function 0) Memory Map:
    ALL 0x00000 to 0x1FFFF   <-- This is decoded as a global (all
                                 device) access. The last device in
                                 the relay chain will respond.
Fn1 (Function 1) Memory Map:
    SDIO device 0   0x00000 to 0x03FFF
    SDIO device 1   0x04000 to 0x07FFF
    SDIO device 2   0x08000 to 0x0BFFF
    SDIO device 3   0x0C000 to 0x0FFFF
    SDIO device 4   0x10000 to 0x13FFF
    SDIO device 5   0x14000 to 0x17FFF
    SDIO device 6   0x18000 to 0x1BFFF
    ALL devices     0x1C000 to 0x1FFFF   <-- This is decoded
                                 as a global (all device) access. The last device
                                 (or any pre-assigned device) in the relay chain
                                 will respond to global commands.
```

This memory may apply equally to all functions, but in other embodiments different memory maps by be assigned to different functions.

Figure 8:
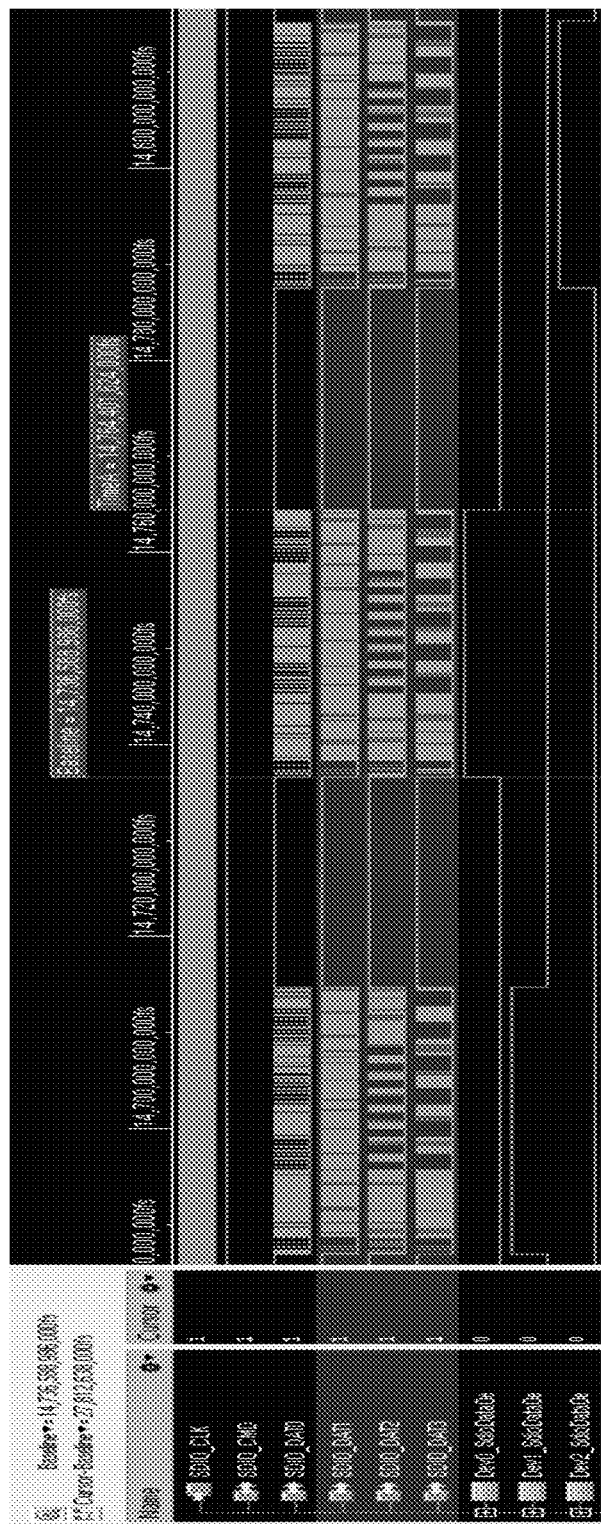
FIG. 8 illustrates a multiple access RSDIO data transfer.
Figure 9:
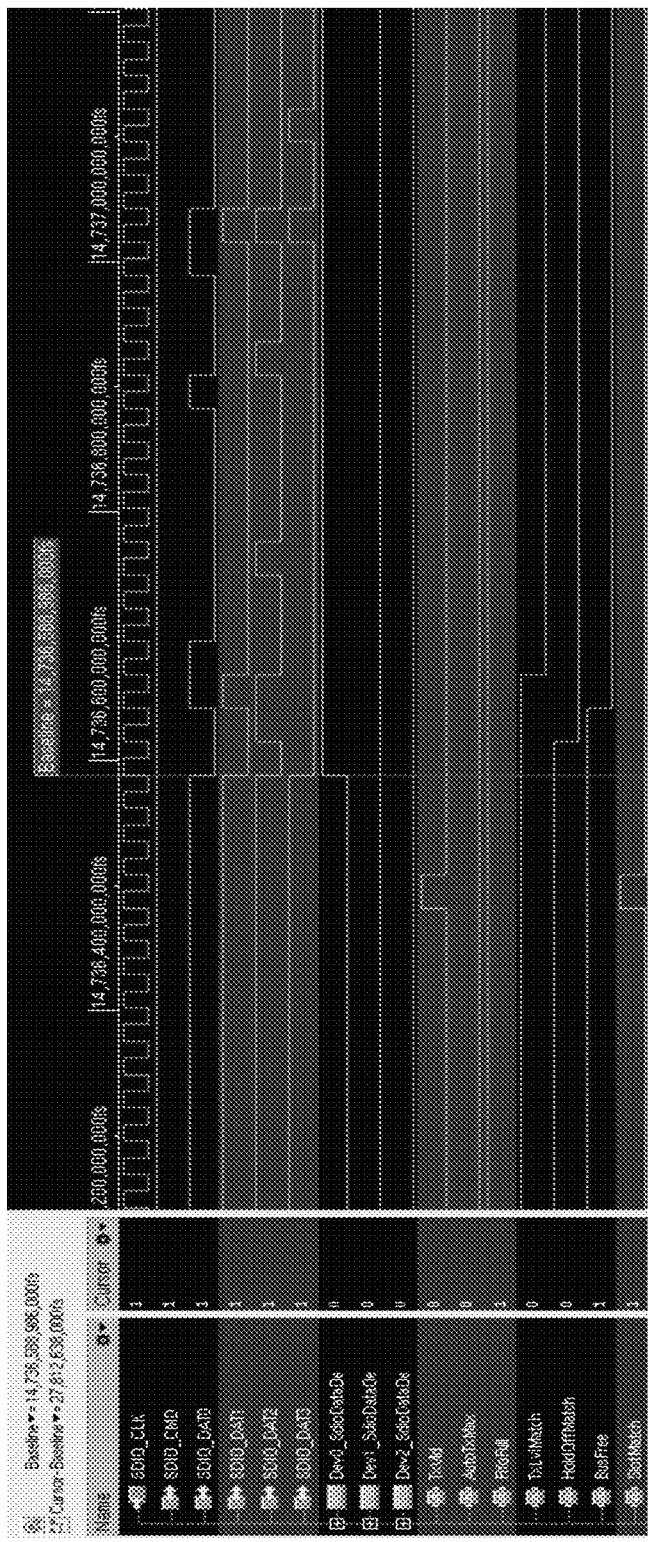
FIG. 9 illustrates the timing of signals implemented by arbitration logic as well as other related signals when a multiple access RSDIO command is being executed.

FIG. 8 illustrates an embodiment of a single SDIO command that initiates a multiple access SDIO data transfer where two or more SDIO units respond to that command and send data back to a host. When a multiple SDIO access is initiated, each SDIO unit will in turn wait/arbitrated for the SDIO Data Bus to send data back to the host in response to the single command from the host. FIG. 9 illustrates example timing of some signals implemented by multiple SDIO arbitration logic controlling the multiple SDIO access as well as other related signals. When a host issues a command through SDIO_CMD, the multiple SDIO arbitration logic detects the start of the command. This triggers a command counter which tracks the number of bits received on the SDIO interface.

Other configurations of the arbitration logic may be implemented with other functionality and signaling as understood by those of ordinary skill in the art. For example a BusFree signal may be shared among the RSDIO devices. This may be a dedicated signal (using a weak pull up and wired OR). Alternately, it may be created from the SDIO_DAT[0] signal. BusFree indicates when the shared bus is available for use. It may not be negated on reset. When BusFree is high, wait for SDIO_DAT[0] goes low (start of data frame). Next, load a transmit counter (TxClkCnt) with number of clocks for transmission+SwIdleCnt, where SwIdleCnt may be chosen to meet SD bus timing requirements. BusFree stays low until TxClkCnt counter counting SDIO clocks has counted down to 0.

Optionally, on the rising edge of BusFree, a periodic slot counter (SlotCnt) (period=n_slots) is reset to 0. Slot-counters of an SDIO device may synchronously count SDIO_CLK cycles, or multiple SDIO clocks. An SDIO device may access the bus when SlotCnt is equal to its assigned slot_number. This scheme may require that only one device is active initially to synchronously start the slot counters in all other devices, otherwise there may be a collision on the first access. The first SDIO device's transmission may be initiated with a directed SDIO CMD53 command.

A level-counter (LvlCnt) counts loops of the slot-counter. Starting at L_max (>0) representing full state down to 0~empty. In some embodiments, an SDIO device will access the bus when it has a frame ready to transmit and its level counter is lower or equal to its buffer level. Optionally, upper MSBs of buffer level may be used (e.g., 8 buffers and L_max=4).

In some embodiments, the data transfers from the connected devices during a multiple SDIO access may be scattered to reduce EMI. In some applications, frames are available at a constant rate. The frame timing can be expressed as a multiple of SDIO clocks. At a continuous rate there are constant gaps between FM frames that may cause an undesired tone.

Scattering may be induced by a TxHoldOff time ranging from 0 to 2×gap time. An RSDIO device does not transmit until its gap-timer (counting SDIO clocks divided by a programmed divider, since last TX of this chip ended) reaches TxHoldOff or a critical buffer level threshold is reached. Other synchronization logic remains active, so the bus is only accessed when it is free. A range of TxHoldOff can be 0 . . . 255. The ticks counted by the gap-timer are gap cycles*2/255. TxHoldOff can be loaded from a LFSR creating a maximum length sequence after every TX. An additional feedback from buffer_level to TxHoldOff is added (add n-times buffer level to gap-timer before compare) to reduce hold-off on increasing buffer levels. On high bus utilization, TX times align to a raster defined by densely packed frames and frame reordering occurs.

FIG. 10 illustrates an SDIO system 20 with four SDIO units 1-4, a host 23, and a single SDIO interface 25. However, unlike FIG. 1, these four units are not relayed SDIO units because they may be individually addressed without the need for relaying. Therefore, there is no need for SDIO units 1-4 of FIG. 10 to have CMD_RELAY outputs. In one embodiment, each of the SDIO units 1-4 in FIG. 10 may be programmed at manufacture with a unique SDIO unit address A1-4. Some configurations may provide for simplification of the SDIO bus sharing mechanism for devices with non-volatile memory (NVM). Many SDIO devices (such as SDIO units 1-4) have NVM which enables parameters relating to the operation of the unit to be stored in the NVM on a semi-permanent basis. When such a capability is present, it can be used to store parameters in a memory of an SDIO unit relating to the operation of the SDIO interface including an SDIO unit address. This enables SDIO unit addresses to be pre-assigned at the point of manufacture, simplifying the mechanism for sharing the SDIO interface and avoids the need for the relay mechanism to assign addresses.

Host 23 may also be programmed with knowledge of the addresses 27 of the SDIO units 1-4 with respect to which it is to interface. Knowing the addresses, host 23 is able to communicate to a single SDIO unit by using/sending the appropriate address embedded in, for example, an SDIO_CMD signal.

As mentioned earlier, an addressing mechanism may have some of the following features that may be used in the relayed implementations of FIGS. 1 and 5 and/or the non-relayed implementation of FIG. 10. For example, an addressing scheme may make use of a standard SDIO command such as the CMD52 and/or CMD53 commands and responses. For CMD52, 'N' bits of the 'register address' field may be re-purposed as an SDIO unit address. This is compatible with current SDIO devices which typically only use a portion of the register address space. The format of the CMD52 in the SDIO specification is illustrated in FIG. 11.

As well as adding the ability to store the SDIO device address, SDIO units 1-4 may be modified from standard operation to respond when addressed directly. In practice, before a host uses commands CMD52 and CMD53 for communication functions, it will execute a number of prior secure digital (SD) commands. Prior SD commands are commands specified in the earlier SD standard that was established before the SDIO standard. In some embodiments, an alternative approach may be used addressing these earlier SD commands. One approach may be to re-interpret these earlier SD commands in a similar manner as listed above for the CMD52 and CMD53 commands to include a device address (e.g. by using the reserved bits of CMD5, for example). If re-interpretation is not a desired approach, another alternative, if all the SDIO devices are identical, would be to let each SDIO unit 1-4 process the initial SD commands and one pre-designated device be nominated to send a response. As mentioned above, non-responding devices may detect SDIO bus errors so their state may be check after initialization is completed to resolve cyclic redundancy checks (CRCs). However, those having ordinary skill in the art will appreciate other various approaches to handling bus errors/CRCs.

As previously mentioned, although four SDIO units 1-4 are depicted in FIG. 10, the number of devices can be extended up to the limit implied by the number of bits used for addressing. In another embodiment, host 23 would be made aware of one SDIO unit and unaware the other three requiring separate addressing. This embodiment makes use of the SDIO concept of logical functions. As understood by those of ordinary skill in the art, a different SDIO function number may be assigned to each of the devices (for single function devices; alternatively different sets of function addresses would be used for multi-function devices). The SDIO standard supports seven functions. The advantage of this approach is that the host would be simplified as it could use standard SDIO functionality, rather than having to re-interpret the standard facilities to enable a bus protocol.

Figure 15:
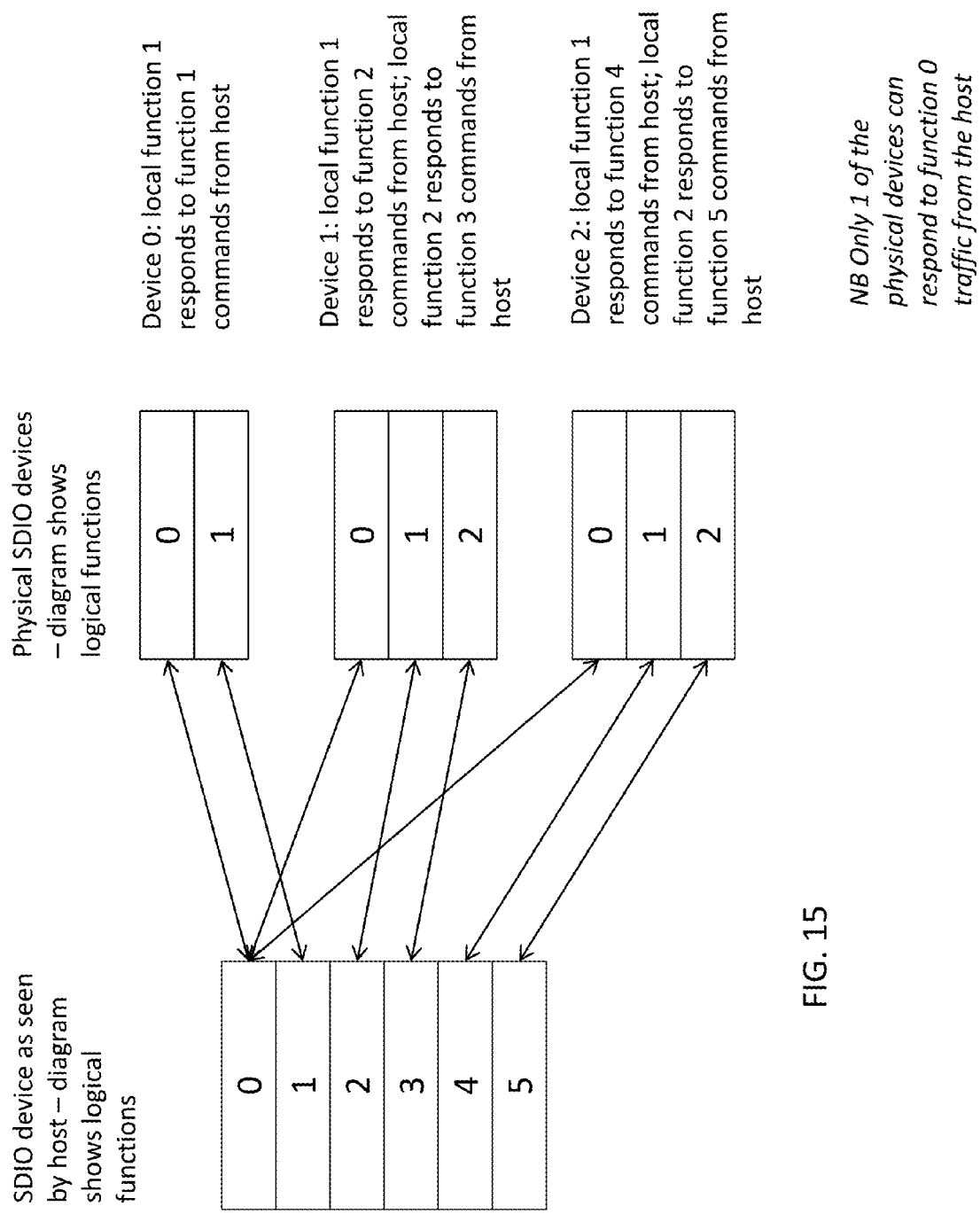
FIG. 15 illustrates one example of how logical functions may be assigned to multiple SDIO devices.

FIG. 15 illustrates one example of how logical functions may be implemented and assigned to three different SDIO devices 100A-C. As illustrated, SDIO device 100A has its local function 1 respond to function 1 commands from the host 102. SDIO device 100B has its local function 1 respond to function 2 commands from the host 102 and its local function 2 respond to function 3 commands from the host 102. SDIO device 100C has its local function 1 respond to function 4 commands from the host 102 and its local function 2 respond to function 5 commands from the host 102. All of the SDIO devices 100A-C are aware of function 0 traffic from the host but only one of the SDIO devices is designated to respond to function 0 traffic.

In other configurations, the use of logical functions may still need to account for initialization sequences using older SD legacy commands. Some embodiments may restrict a set of identical SDIO devices to process common SD signaling and initial Function 0 signaling. Other embodiments may uses a hybrid approach with distinct device addresses and function addresses, as understood by those of ordinary skill in this art and as discussed above.

Example methods may be better appreciated with reference to flow diagrams. While for purposes of simplicity, explanation of the illustrated methodologies are shown and described as a series of blocks. It is to be appreciated that the methodologies are not limited by the order of the blocks, as some blocks can occur in different orders and/or concurrently with other blocks from that shown and described. Moreover, less than all the illustrated blocks may be required to implement an example methodology. Blocks may be combined or separated into multiple components. Furthermore, additional and/or alternative methodologies can employ additional, not illustrated blocks.

Figure 12:
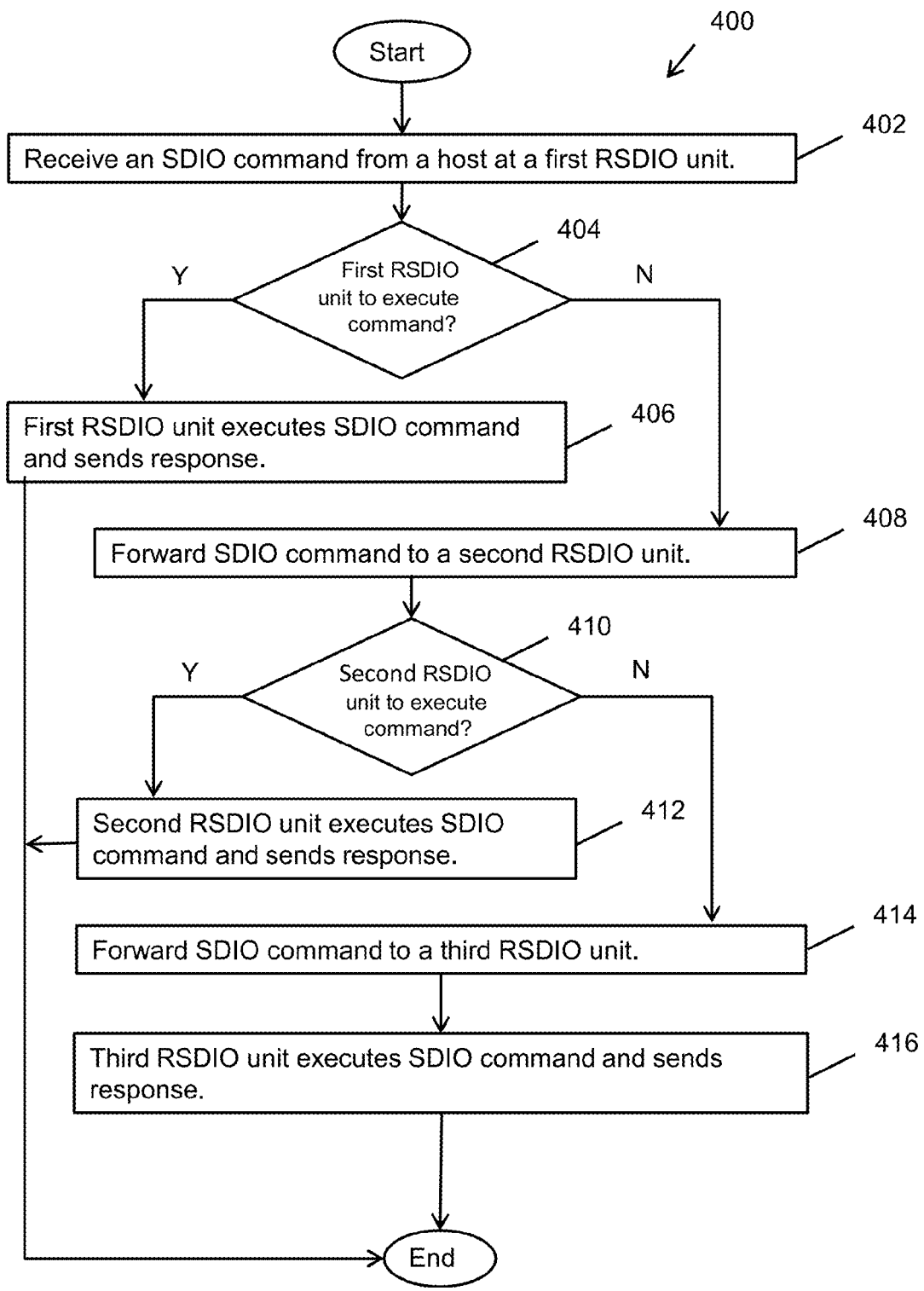
FIG. 12 illustrates one example method of operations in a Relay SDIO system.

FIG. 12 illustrates a method 400 of using a single host and a single SDIO to interface with two or more relay SDIO (RSDIO) units. The method 400 begins by receiving an SDIO command from a host at a first RSDIO unit through an SDIO interface at a first RSDIO unit at 402. Regards of whether the first RSDIO unit is to respond to the command, it always forwards the command immediately upon receipt to second RSDIO unit at 404. As discussed above, the first RSDIO unit contains SDIO relay logic that will forward the SDIO command from a relay port on the first RSDIO unit to an SDIO_CMD port on the second RSDIO unit. A determination is made at 406 to determine if the first RSDIO unit should respond to the SDIO command. In one configuration, this determination may be made by relay logic in each of the RSDIO units. For example, the relay logic can decode the SDIO command and determine based, at least in part, on the SDIO command if the first RSDIO unit is to respond. As discussed above, this determination can be based on address bits in the SDIO command. If the first RSDIO unit is to respond, it executes the command and sends a response through the single SDIO interface to the host at 408. When the second RSDIO unit receives the command, the second RSDIO unit always forwards the same command to a third RSDIO unit at 410. A determination is made at 412 to determine if the second RSDIO unit is to execute the command. If the second RSDIO unit determines that it is to execute the SDIO command, it then executes the command and sends a response through the single SDIO interface to the host at 414. Similar to the first two SDIO units, the third RSDIO unit will determine if it is to execute the command and, if so, execute that command at 416 and send a response to the host. Of course, this is an example with three RSDIO units; however, other examples may contain more than three RSDIO units and have a similar flow to FIG. 4.

Figure 13:
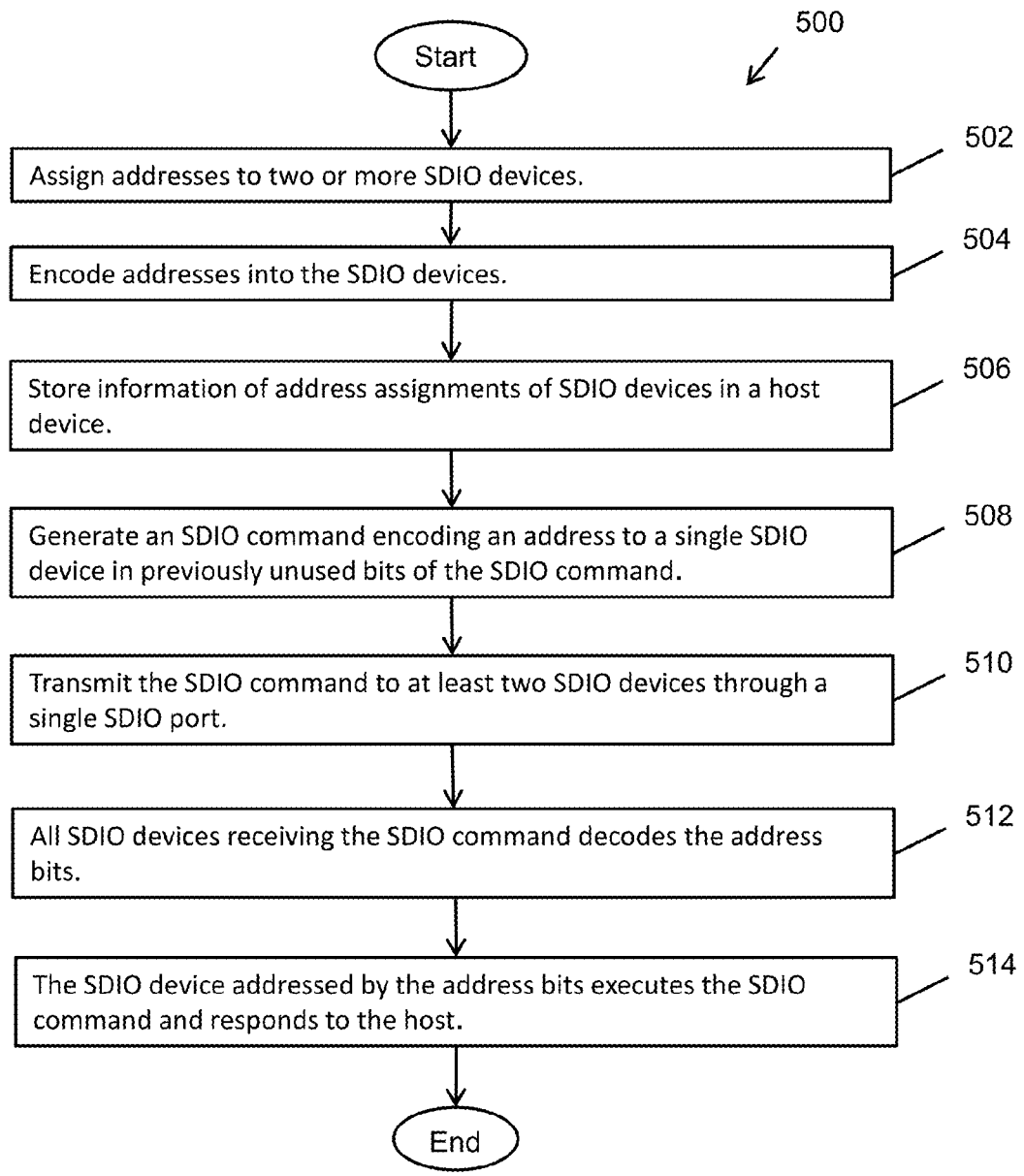
FIG. 13 illustrates one example method of operations of a system using a single SDIO interface to access two or more SDIO units.

FIG. 13 illustrates an example method 500 of using a single device and a single SDIO interface to communicate with two or more SDIO devices using free bits in an existing SDIO command instruction. This method 500 begins by assigning addresses to SDIO units at 502. These addresses are entered into the SDIO devices at 504. The addresses can be entered into NVR, discussed above, hard wired into hardware or address decoding logic in the SDIO devices, or encoded in the SDIO devices in another way. Information about the address assignments is similarly stored in a host device at 506. The method 500 generates and SDIO command encoding an address to a single SDIO device in previously unused bits of that command at 508. This command may be generated by the host. The SDIO command is then transmitted to at least two SDIO devices through a single SDIO port at 510. All SDIO devices receiving the SDIO command decode the address bits stored in the SDIO command at 512. In one embodiment, just the SDIO device addressed by those bits executes the command and responds to the host at 514 through the single SDIO interface.

Figure 14:
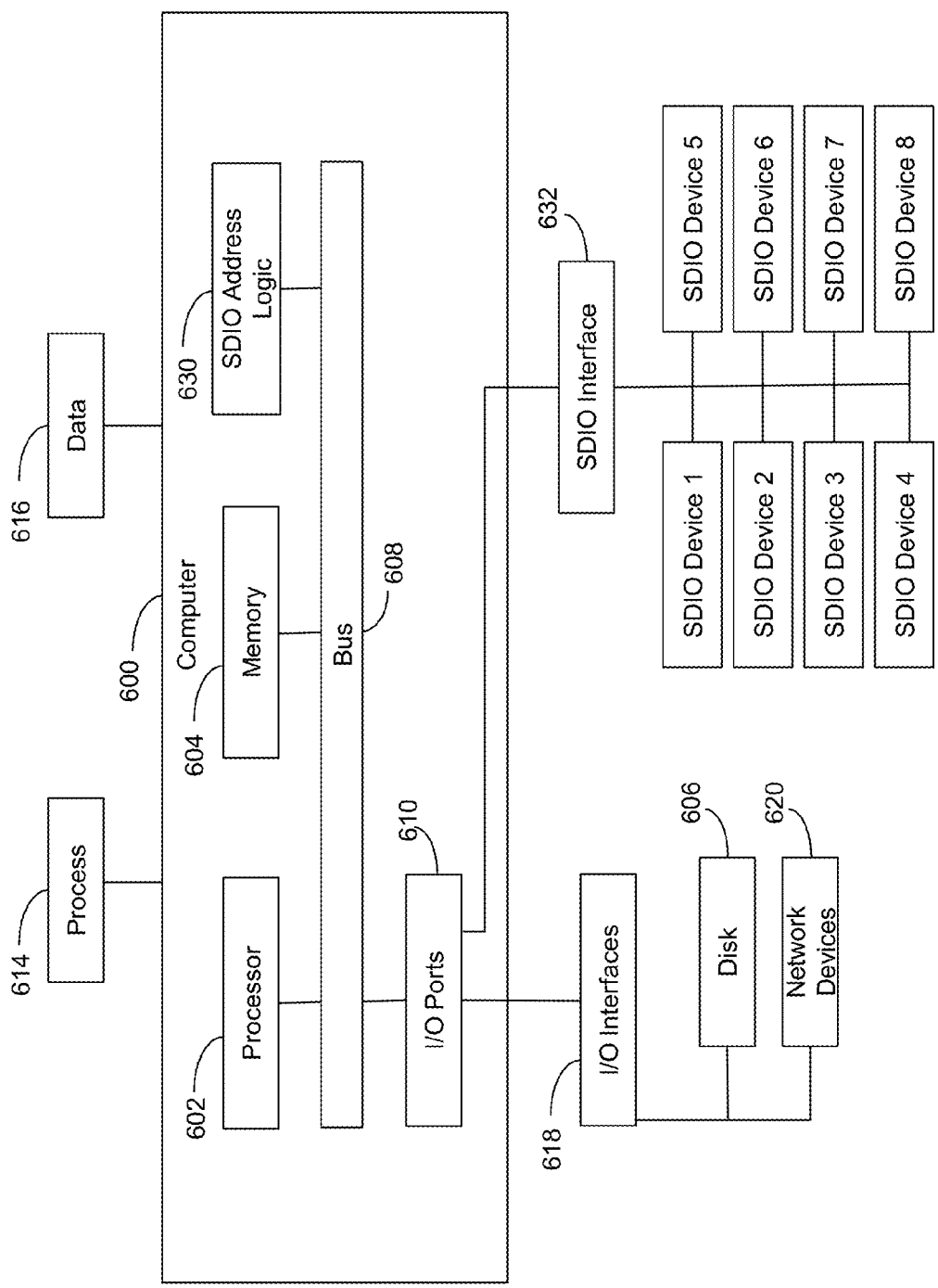
FIG. 14 illustrates one example computer system using a single SDIO interface to access eight SDIO devices.

FIG. 14 illustrates an example computing device in which example systems and methods described herein, and equivalents, may operate. The example computing device may be a computer 600 that may be a host device. The computer 600 includes a processor 602, a memory 604, and input/output ports 610 operably connected by a bus 608. In one example, the computer 600 may include a SDIO address logic 630 configured to determine to which SDIO device 1-8 to address and have execute an SDIO command. This can be performed as discussed above by placing an address representing one of the SDIO devices 1-8 in unused bits of the command to be executed. In different examples, SDIO address logic 630 may be implemented in hardware, software, firmware, and/or combinations thereof. Thus, logic 630 may provide means (e.g., hardware, software, firmware) for placing an address in an SD or an SDIO instruction so that one SDIO device executes and responds to that instruction. While logic 630 is illustrated as a hardware component attached to bus 608, it is to be appreciated that in one example, logic 630 could be implemented in processor 602.

Generally describing an example configuration of computer 600, processor 602 may be a variety of various processors including dual microprocessor and other multi-processor architectures. Memory 604 may include volatile memory and/or non-volatile memory. Non-volatile memory may include, for example, ROM, PROM, EPROM, and EEPROM. Volatile memory may include, for example, RAM, synchronous RAM (SRAM), dynamic RAM (DRAM), synchronous DRAM (SDRAM), double data rate SDRAM (DDR SDRAM), direct RAM bus RAM (DRRAM) and the like.

A disk 606 may be operably connected to computer 600 via, for example, an input/output interface (e.g., card, device) 618 and an input/output port 610. Disk 606 may be, for example, a magnetic disk drive, a solid state disk drive, a floppy disk drive, a tape drive, a Zip drive, a flash memory card, and/or a memory stick. Furthermore, disk 606 may be a CD-ROM, a CD recordable drive (CD-R drive), a CD rewriteable drive (CD-RW drive), and/or a digital video ROM drive (DVD ROM). Memory 604 can store a process 614 and/or a data 616, for example. Disk 606 and/or memory 604 can store an operating system that controls and allocates resources of computer 600.

Bus 608 may be a single internal bus interconnect architecture and/or other bus or mesh architectures. While a single bus is illustrated, it is to be appreciated that computer 600 may communicate with various devices, logics, and peripherals using other busses (e.g., PCIE, SATA, Infiniband, 1384, USB, Ethernet). Bus 608 can be types including, for example, a memory bus, a memory controller, a peripheral bus, an external bus, a crossbar switch, and/or a local bus.

Computer 600 may interact with input/output devices via input/output interfaces 618 and input/output ports 610. Input/output devices may be, for example, a keyboard, a microphone, a pointing and selection device, cameras, video cards, displays, the disk 606, the network devices 620, and so on. The input/output ports 610 may include, for example, serial ports, parallel ports, USB ports and the like.

A single SDIO interface 632 interfaces with a input/output port 610. Eight SDIO devices 1-8 are connected in parallel to single input/output ports 610. As discussed above, these SDIO devices 1-8 are each preloaded with a different address so that only the SDIO device that is actually addressed by an address placed in prior unused bits of an SDIO command will respond to that command.

Computer 600 can operate in a network environment and thus may be connected to network devices 620 via input/output interfaces 618, and/or the input/output ports 610. Through network devices 620, computer 600 may interact with a network. Through the network, computer 600 may be logically connected to remote computers. Networks with which computer 600 may interact include, but are not limited to, a local area network (LAN), a wide area network (WAN), and other networks. The networks may be wired and/or wireless networks.

In the foregoing description, certain terms have been used for brevity, clearness, and understanding. No unnecessary limitations are to be implied therefrom beyond the requirement of the prior art because such terms are used for descriptive purposes and are intended to be broadly construed. Therefore, the invention is not limited to the specific details, the representative embodiments, and illustrative examples shown and described. Thus, this application is intended to embrace alterations, modifications, and variations that fall within the scope of the appended claims.

Moreover, the description and illustration of the invention is an example and the invention is not limited to the exact details shown or described. References to "the preferred embodiment", "an embodiment", "one example", "an example" and so on, indicate that the embodiment(s) or example(s) so described may include a particular feature, structure, characteristic, property, element, or limitation, but that not every embodiment or example necessarily includes that particular feature, structure, characteristic, property, element or limitation.

What is claimed is:

1. A secure digital input/output (SDIO) system comprising: a host;
   an SDIO interface connected to the host; a first relay SDIO (RSDIO) unit connected to the SDIO interface; a second RSDIO unit connected to the SDIO interface; wherein the first RSDIO unit further comprises;
   a. a first SDIO command port;
   b. a first RSDIO relay port connected to the second RSDIO unit;
   c. a first SDIO relay logic configured to determine if the first RSDIO unit is to process an SDIO command received on the first SDIO command port, wherein when the first RSDIO unit is to process the SDIO command, the first RSDIO unit processes the SDIO command and sends results of processing the SDIO command to the SDIO interface; and
   d. wherein the first RSDIO unit automatically transmits the SDIO command from the first RSDIO relay port to a second SDIO command port in the second RSDIO unit: and a third RSDIO unit connected to the SDIO interface, wherein the third RSDIO unit has a third SDIO command port and wherein the second RSDIO unit further comprises:
   e. a second RSDIO relay port connected to the third SDIO command port:
   f. a second SDIO relay logic configured to determine if the second RSDIO unit is to process the SDIO command, wherein when the second RSDIO unit is to process the SDIO command, the second RSDIO unit processes the SDIO command and sends results of processing the SDIO command to the SDIO interface and to the first RSDIO relay port; and
   g. wherein the second RSDIO unit automatically transmits the SDIO command from the second RSDIO relay port to the third SDIO command port in the third RSDIO unit.

2. The SDIO system of claim 1 wherein when the second RSDIO unit processes the SDIO command, results generated by the second RSDIO unit passed to the first RSDIO relay port are passed to the first SDIO command port and then forwards to the SDIO interface.

3. The SDIO system of claim 1 wherein the SDIO relay logic is configured to determine if the first RSDIO unit is to process the SDIO command based, at least in part, on an address imbedded in the first RSDIO unit and an address in the SDIO command.

4. The SDIO system of claim 1 wherein the SDIO interface comprises:
   an SDIO clock (SDIO_CLK) port;
   an SDIO data (SDIO_DAT) port; and
   an SDIO command (SDIO_CMD) port.

5. The SDIO system of claim 4 wherein a bus connected to the SDIO data port is a bidirectional data bus driven by the first RSDIO unit or the second RSDIO unit.

6. The SDIO system of claim 5 wherein the data bus is a tri-state data bus.

7. The SDIO system of claim 4 wherein the SDIO data port comprises four bits (SDIO_DAT[3:0]).

8. The SDIO system of claim 1 wherein the first RSDIO unit comprises a radio and the second RSDIO unit comprises a radio.

9. A secure digital input output (SDIO) system comprising: a first SDIO unit comprising:
   a first SDIO clock input port;
   a. a first SDIO data bus output port;
   b. a first SDIO bidirectional command port;
   c. a first address associated with the first SDIO unit, wherein the first SDIO unit will not respond to an SDIO command unless an SDIO unit address encoded in the SDIO command matches the first address indicator;

a second SDIO unit comprising:
  d. a second SDIO clock input port;
  e. a second SDIO data bus output port;
  f. a second SDIO bidirectional command port; and
  g. a second address indicator associated with the second SDIO unit, wherein the second SDIO unit will not respond to the SDIO command unless an SDIO unit address encoded in the SDIO command matches the second address indicator;
an SDIO bidirectional line connected to the SDIO interface, the first SDIO bidirectional command port and the second SDIO bidirectional command port;
an SDIO data bus connected to the SDIO interface, the first SDIO data bus output port and the second SDIO data bus output port; and
wherein a clock is received at the first SDIO clock input port and the second SDIO clock input port in parallel, wherein data is received at the first SDIO bidirectional command port and the second SDIO bidirectional command port in parallel, and wherein only the first SDIO unit or the second SDIO unit that is responding to the SDIO command drives the SDIO bidirectional line and the SDIO data bus.

10. The SDIO system of claim 9 further comprising:
a single SDIO interface;
a host device configured to send the SDIO command through the single SDIO interface to both the first SDIO unit and the second SDIO unit.

11. The SDIO system of claim 9 wherein the host device has knowledge of the first address indicator and the second address indicator and is configured to place SDIO unit address into formerly unused bits of at least one of the group of: a secure digital (SD) command and the SDIO command.

12. The SDIO system of claim 9 wherein the first SDIO unit further comprises:
  a first non-volatile memory with the first address indicator stored in the first non-volatile memory; and wherein the second SDIO unit further comprises:
  a second non-volatile memory with the second address indicator stored in the second non-volatile memory.

13. The SDIO unit of claim 9 wherein the SDIO command is an SDIO IO_RW_DIRECT Command (CMD52) command with the SDIO unit address stored in formerly unused bits of a register address field of CMD52.

14. The SDIO unit of claim 9 wherein the wherein the SDIO unit further comprises a radio.

15. The SDIO unit of claim 9 wherein the SDIO data bus is a four bit bus.

16. A Relay SDIO (RSDIO) system comprising:
a host;
an SDIO interface at the host;
a memory map of logical functions visible to the host;
a first RSDIO device assigned a first group of logical functions that is a subset of the memory map of logical functions visible to the host, wherein the first RSDIO device has a first command port for receiving SDIO commands and a relay port for relaying SDIO commands to another RSDIO device;
a second RSDIO device assigned a second group of logical functions that is a subset of the memory map of logical functions visible to the host, wherein the first group of logical functions and the second group of logical functions do not overlap, except for logical function 0, wherein the second RSDIO device further has a second command port for receiving relayed SDIO commands from the relay port of the first RSDIO device;
an SDIO data (SDIO_DAT) port connected to the SDIO interface and shared by the first RSDIO device and the second RSDIO device;
an SDIO command (SDIO_CMD) port connected to the SDIO interface and connected to the first command port of the first RSDIO device,
wherein the first RSDIO device and the second RSDIO device appear as a single device to the host;
wherein the first SDIO device is configured to receive on the first command port an SDIO command having a received logical function number and to relay the SDIO command out the relay port to the second command port of the second RSDIO device, wherein the first RSDIO device and the second RSDIO device are configured to determine which of the first SDIO device and the second SDIO device is to respond to the SDIO command based, at least in part, on the first group of logical functions, the second group of logical functions, and the received logical function number.

* * * * *